United States Patent
Gadsing et al.

(10) Patent No.: US 7,818,483 B2
(45) Date of Patent: Oct. 19, 2010

(54) METHODS AND APPARATUSES FOR IMPROVING SATA TARGET DEVICE DETECTION

(75) Inventors: Sagar G. Gadsing, Colorado Springs, CO (US); Jason C. McGinley, Castle Rock, CO (US); Shawn M. Swanson, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 142 days.

(21) Appl. No.: 12/332,123

(22) Filed: Dec. 10, 2008

(65) Prior Publication Data

US 2010/0146166 A1 Jun. 10, 2010

(51) Int. Cl.
  *G06F 13/00* (2006.01)
  *G06F 13/42* (2006.01)
  *G06F 13/14* (2006.01)
(52) U.S. Cl. .................... 710/100; 710/74; 710/105; 710/110
(58) Field of Classification Search .................. 710/100
  See application file for complete search history.

(56) References Cited

U.S. PATENT DOCUMENTS

| | | | |
|---|---|---|---|
| 7,587,294 B2 * | 9/2009 | Cheong | 702/117 |
| 7,664,042 B2 * | 2/2010 | Utsunomiya et al. | 370/242 |
| 2006/0277331 A1 * | 12/2006 | Priborsky et al. | 710/60 |
| 2007/0005813 A1 * | 1/2007 | Juang et al. | 710/1 |
| 2007/0005850 A1 * | 1/2007 | Chang et al. | 710/74 |
| 2007/0005855 A1 * | 1/2007 | Lu et al. | 710/107 |
| 2007/0088879 A1 * | 4/2007 | Huang et al. | 710/74 |
| 2008/0028265 A1 * | 1/2008 | Tseng et al. | 714/56 |
| 2008/0104480 A1 * | 5/2008 | Tseng et al. | 714/758 |
| 2009/0177831 A1 * | 7/2009 | Nemazie et al. | 710/310 |

OTHER PUBLICATIONS

"Working Draft Serial Attached SCSI (SAS)"; International Committee for Information Technology Standards (INCITS) T10 Technical Committee; Revision 3b; Jan. 26, 2003; various pages.*
"Serial ATA: High Speed Seralized AT Attachment"; SerialATA Workgroup; Revision 1.0a; Jan. 7, 2003; various pages.*

* cited by examiner

*Primary Examiner*—Ryan M Stiglic
(74) *Attorney, Agent, or Firm*—Duft Bornsen & Fishman, LLP

(57) ABSTRACT

Methods and apparatuses for improving detection of a Serial Advanced Technology Attachment ("SATA") target device by a storage initiator over a link. The storage initiator receives a Frame Information Structure ("FIS") and determines whether the FIS is valid. In direct response to a determination that the FIS is invalid, the storage initiator immediately resets the link to the SATA target device.

20 Claims, 4 Drawing Sheets

*FIG. 4*

Apparatus
410

Receiving element
420

Determining element
430

Resetting element
440

METHODS AND APPARATUSES FOR IMPROVING SATA TARGET DEVICE DETECTION

BACKGROUND

1. Field of the Invention

The invention relates generally to storage devices and more specifically relates to Serial Advanced Technology Attachment ("SATA") device detection.

2. Discussion of Related Art

Although computer systems have increased in operating speed dramatically, initialization of the computer systems has remained time consuming. Slow booting of the computer systems and slow initialization of their related components have long been sources of complaint by users and customers, and these remain to be problems faced by computer system and device manufacturers. One related component of a computer system is the storage subsystem, which may be considered part of the computer system, external to the computer system, and/or both (i.e., a portion of the storage subsystem may be seen as part of the computer system while another portion may be seen as external to the computer system) in a wide variety of configurations.

Many storage subsystems today conform to standards including SATA and Serial Attached SCSI ("SAS"). Additionally, many storage subsystems comprise a storage initiator and a SATA target device. The storage initiator initiates communication with the SATA target device including proper detection of the SATA target device. Examples of the storage initiator include a SAS controller (e.g., a SAS Redundant Array of Independent Disks ("RAID") host bus adapter), a self-configuring SAS expander, and a SATA controller. The SAS controller and the SAS expander would support the Serial ATA Tunneling Protocol ("STP") in order for them to communicate with the SATA target device. A SAS expander typically facilitates communications between SATA/SAS devices rather than initiating communication on its own. However, a self-configuring SAS expander is capable of initiating communication in order to fill its own routing table for routing storage requests.

One cause for the slow initialization of the storage subsystem is that the SATA target device in some instances fails to send a valid Frame Information Structure ("FIS") to the storage initiator. As a result, the storage initiator fails to detect the SATA target device, causing significant delays as the storage initiator times out and restarts the initialization process. More specifically, during initialization the storage initiator and the SATA target device exchange a series of messages and negotiate a communication speed. The storage initiator then expects to receive a valid FIS from the SATA target device. If the storage initiator receives an invalid FIS, the storage initiator simply ignores the invalid FIS and continues to wait before restarting the initialization process. The waiting/timeout period may be as long as sixty seconds, which contributes to and exacerbates the slow booting of the computer system.

One potential solution is to wait a shorter period of time, for example by having a waiting/timeout period shorter than sixty seconds. However, it is difficult to configure an ideal waiting/timeout period because there are many types of SATA target devices. For example, if the SATA target device is a large SATA disk drive, it may take a long time for the large SATA disk drive to send an FIS. If the storage initiator times out too soon, the storage initiator would time out repeatedly without even giving the SATA target device an opportunity to send a valid FIS. Conversely, if the SATA target device is a small SATA disk drive, the storage initiator would still waste too much time waiting after ignoring an invalid FIS sent by the small SATA disk drive.

Another source of problem is that the SATA target device may in some instances fail to send a valid FIS due to design flaws that do not conform to the standards. In certain cases, it has been identified that some SATA disk drives abnormally send an invalid FIS for some reason even though the SATA disk drives have not yet completed initializing their internal state machine. However, many of these SATA disk drives have already been mass produced and widely distributed; replacing them would be cost prohibitive. Additionally, even if this particular identified problem is corrected, there may be other causes for the SATA target device to fail to send a valid FIS and still cause significant delays in detecting the SATA target device.

Thus it is an ongoing challenge to improve detection of SATA target devices.

SUMMARY

The present invention solves the above and other problems, thereby advancing the state of the useful arts, by providing methods and apparatuses for improving detection of a Serial Advanced Technology Attachment ("SATA") target device by a storage initiator over a link. The storage initiator receives a Frame Information Structure ("FIS") and determines whether the FIS is valid. In direct response to a determination that the FIS is invalid, the storage initiator immediately resets the link to the SATA target device. Advantageously, rather than simply ignoring an invalid FIS and passively waiting a waiting/timeout period before restarting the initialization process, methods and apparatuses are provided to proactively reset the link to the SATA target device immediately. Accordingly, detection of the SATA target device is improved without the significant delay associated with waiting the difficult-to-configure waiting/timeout period and without having to correct problematic SATA target devices.

In one aspect hereof, a method is provided for improving detection of a Serial Advanced Technology Attachment ("SATA") target device by a storage initiator over a link. The method comprises receiving, at the storage initiator, a Frame Information Structure ("FIS"). The method also comprises determining, at the storage initiator, whether the FIS is valid. Additionally, the method comprises resetting the link in direct response to the determination step immediately following the determining step.

Another aspect hereof provides an apparatus for detecting a Serial Advanced Technology Attachment ("SATA") device over a link. The apparatus comprises a receiving element for receiving a Frame Information Structure ("FIS") and a determining element for determining whether the FIS is valid. The apparatus also comprises a resetting element for resetting the link in direct response to the determining element determining that the FIS is invalid, in that resetting the link immediately follows the determining element determining that the FIS is invalid.

BRIEF DESCRIPTION OF THE DRAWINGS

FIG. 4 is a block diagram of an exemplary apparatus for improving detection of SATA target devices.

DETAILED DESCRIPTION OF THE DRAWINGS

Figure 1:
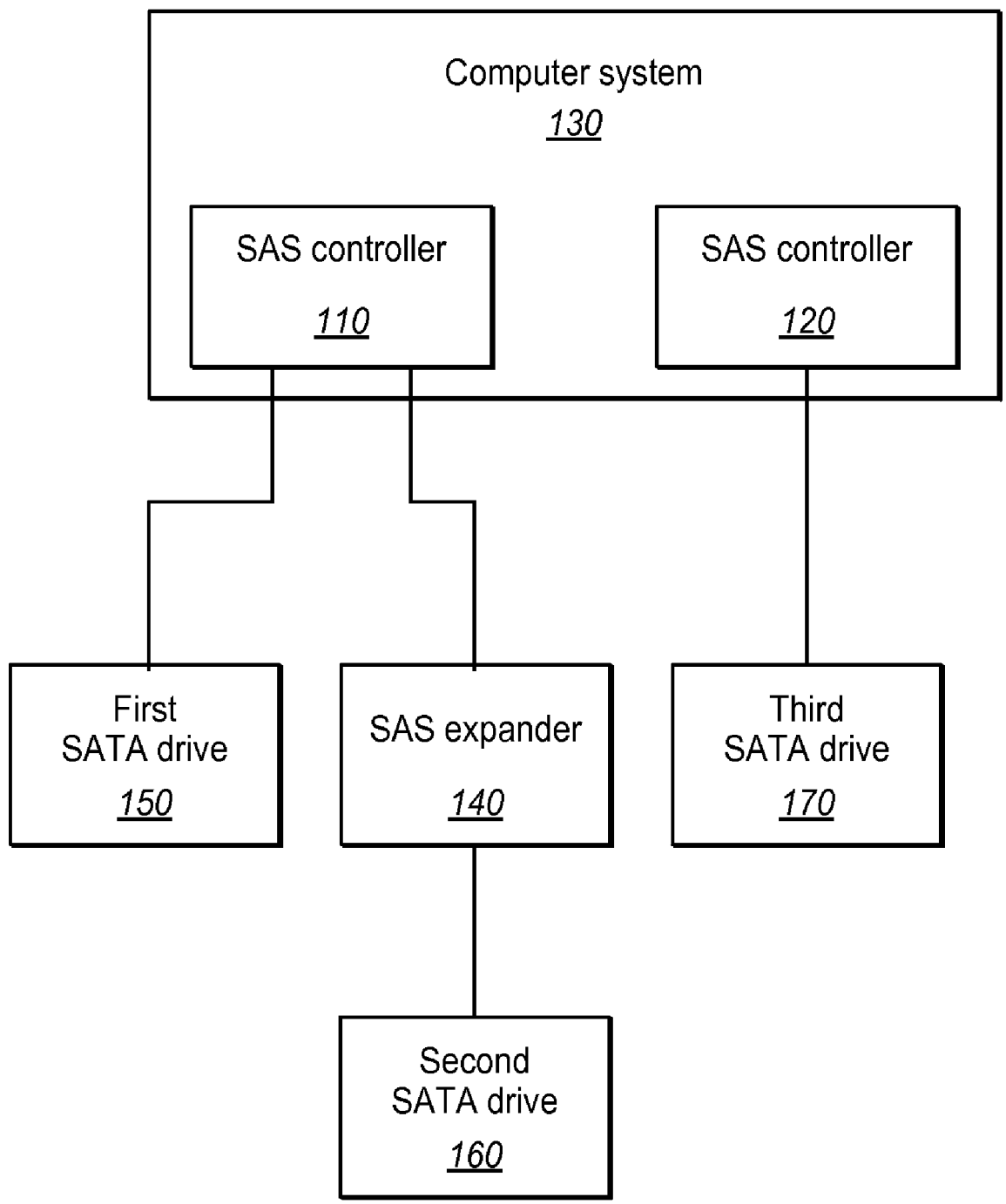
FIG. 1 is a block diagram of an exemplary system for improving detection of SATA target devices.

FIG. 1 is a block diagram of an exemplary system for improving detection of SATA target devices. FIG. 1 depicts a variety of exemplary couplings between an initiator/controller of a computer system and a SATA drive. A computer system 130 comprises a SAS controller 110 and a SATA controller 120. The SAS controller 110 is in communication with a first SATA drive 150 and a SAS expander 140. Through the SAS expander 140, the SAS controller 110 is also in communication with a second SATA drive 160. Additionally, the SATA controller 120 is in communication with a third SATA drive 170. A storage subsystem related to the computer system 130 comprises the SAS controller 110 and the first SATA drive 150, the SAS expander 140 and the second SATA drive 160, and/or the SATA controller 120 and the third SATA drive 170.

The computer system 130 may be a computer server, a computer client, or any computing system that comprises at least one of the SAS controller 110 and the SATA controller 120. The SAS controller 110 may be any host bus adapter including a RAID controller that supports the SAS interface (including the STP protocol of the SAS standards) and the SATA interface. Similarly, the SATA controller 120 may be any host bus adapter including a RAID controller that supports the SATA interface. The first SATA drive 150, the second SATA drive 160, and the third SATA drive 170 may be any drives that support the SATA interface. For example, a drive may a disk drive, a tape drive or library, or a solid state drive. The SAS expander 140 typically facilitates communications between SATA/SAS devices as discussed above. A self-configuring SAS expander, as the SAS expander 140 may be, is also capable of initiating communication with a target device. Both the SAS controller 110 and the SAS expander 140 support STP and SATA in order for them to communicate with the SATA drives.

A storage initiator (e.g., one of the SAS controller 110, the SAS expander 140, and the SATA controller 120) initiates communication with a SATA target device (e.g., a SATA disk drive including one of the SATA drives) including initialization and detection of the SATA target device. For example, between the SAS controller 110 and the first SATA drive 150, the SAS controller 110 acts as a SATA initiator and supports SATA in order to communicate with the first SATA drive 150. Between the SAS controller 110 and the second SATA drive 160, the SAS expander 140 acts as a SATA initiator and supports SATA in order to communicate with the second SATA drive 160. Meanwhile, the SAS controller 110 communicates with the SAS expander 140 using STP and the SAS expander 140 supports both SATA and STP. Between the SATA controller 120 and the third SATA drive 170, the SATA controller 120 acts as a SATA initiator and supports SATA in order to communicate with the third SATA drive 170. The storage subsystem related to the computer system 130 is then initialized; the initialization may be part of a boot process of the computer system 130.

As discussed above, the storage initiator and the SATA target device exchange a series of messages and negotiate a communication speed. The storage initiator then expects to receive a valid FIS from the SATA target device. Rather than waiting any waiting/timeout period, the storage initiator immediately restarts the initialization and detection process in direct response to a determination that the FIS is invalid. This immediate response improves speed in detection of the SATA target device, thus improving the speed in initializing the storage subsystem related to the computer system 130 and also the boot process of the computer system 130.

Figure 2:
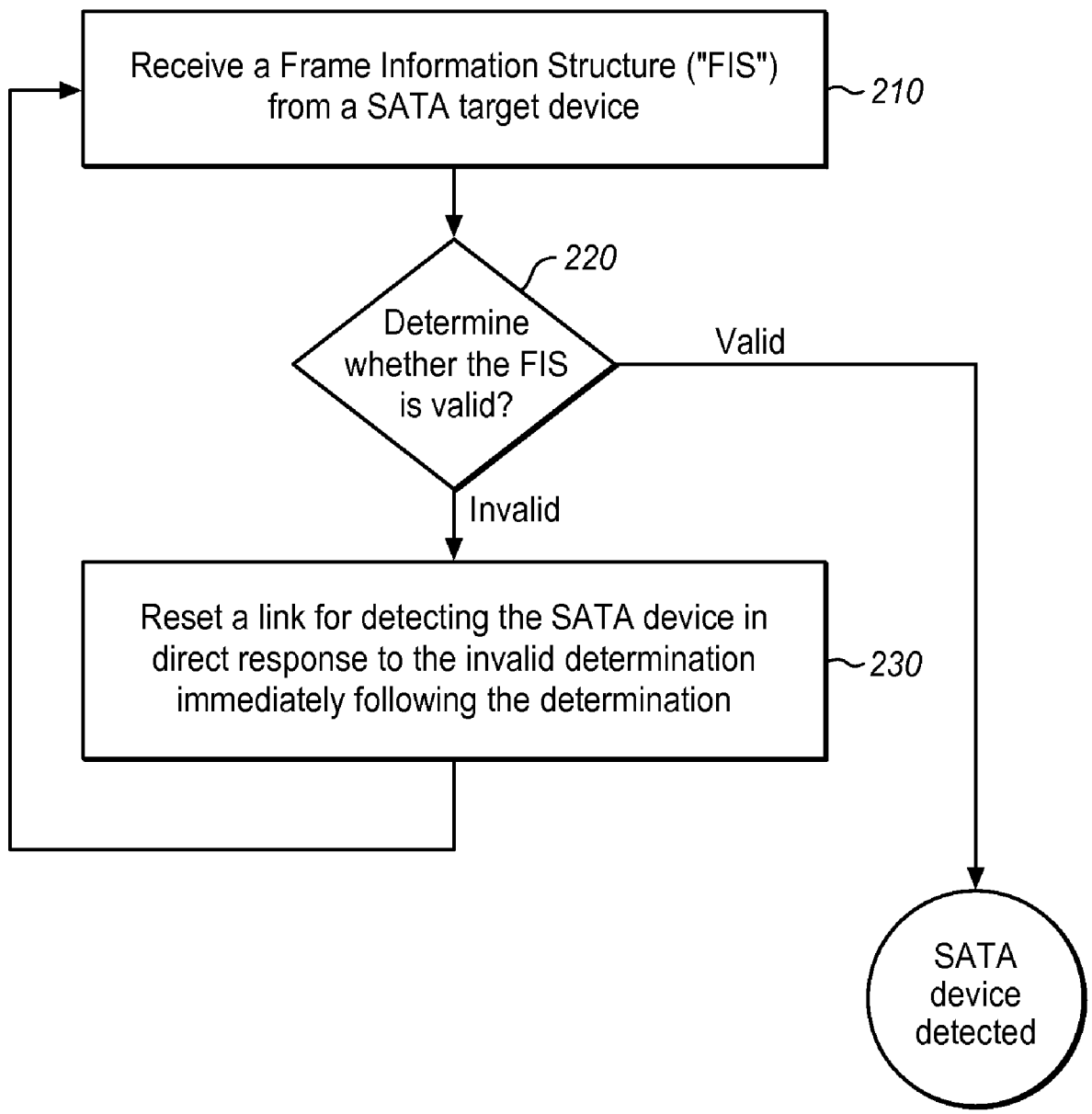
FIG. 2 is a flowchart describing an exemplary method in accordance with features and aspects hereof to improve detection of SATA target devices.

FIG. 2 is a flowchart describing an exemplary method in accordance with features and aspects hereof to improve detection of SATA target devices. At step 210, a storage initiator receives an FIS from a SATA target device. The initiator immediately determines at 220 whether the FIS is valid. Determining whether the FIS is valid comprises checking whether the FIS comprises an AT Attachment ("ATA") signature or an AT Attachment Packet Interface ("ATAPI") signature as will be discussed in greater detail. If the FIS is valid, the SATA device is detected. If the FIS is invalid, the storage initiator immediately proceeds to step 230 in direct response to the determination that the FIS is invalid.

It is noted that due to gate/electrical propagation and/or normal computer program execution delays, the direct response may not be instantaneous as will be understood by those skilled in the art. However, the response to the determination that the FIS is invalid is direct and immediate; in other words, the storage initiator does not passively wait any arbitrary waiting/timeout period before taking action, nor does the storage initiator actively take an intervening action (e.g., setting a timer and waiting for the timer to expire before taking action). Indeed, the storage initiator proceeds to step 230 immediately and in direct response to the determination that the FIS is invalid.

At step 230, the storage initiator resets a link in direct response to the determination that the FIS is invalid. Resetting the link may comprise issuing a reset command from the storage initiator to the SATA target device immediately following the determination that the FIS is invalid. After taking immediate action by resetting the link, the storage initiator returns to step 210 (among other initialization processes) to receive a valid FIS.

Figure 3:
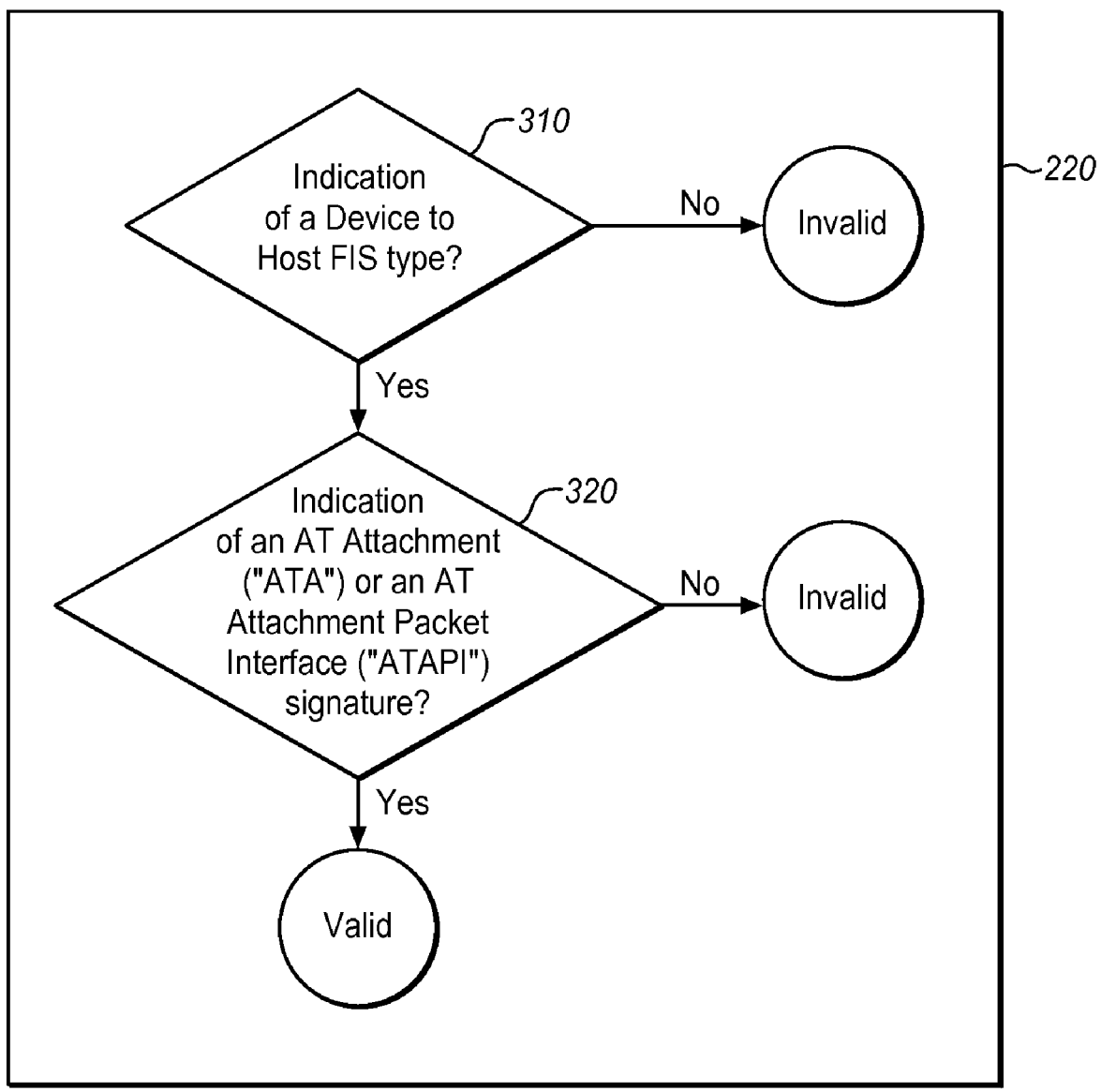
FIG. 3 is a flowchart describing exemplary additional details for determining whether an FIS is valid.

FIG. 3 is a flowchart describing exemplary additional details for determining whether an FIS is valid as determined by step 220 of FIG. 2. At step 310, the storage initiator checks for an indication of a Device to HOST FIS type in the FIS. If the FIS does not include this indication, the FIS is invalid. Otherwise, the storage initiator proceeds to step 320. At step 320, the storage initiator checks for an indication of an ATA signature in the FIS or for an indication of an ATAPI signature in the FIS. If the FIS does not include either of the indications, the FIS is invalid. Otherwise, the FIS is valid.

Those skilled in the art will recognize that a first byte of the FIS typically indicates a type of the FIS. A value of 0x34 indicates that the FIS is a Device to HOST FIS. Additionally, an ATA signature would typically be indicated by two bytes that are both 0x0, while an ATAPI signature would typically be indicated by two bytes that are 0x14 and 0xEB. It is noted that there may be other ways to determine whether the FIS is valid, and those additional details are not described for brevity.

Indeed, those of ordinary skill in the art will readily recognize numerous additional and equivalent steps that may be performed and/or omitted in the methods of FIGS. 2 and 3. Such additional and equivalent steps are omitted herein merely for brevity and simplicity of this discussion.

FIG. 4 is a block diagram of an exemplary apparatus for improving detection of SATA target devices. Those of ordinary skill in the art will readily recognize that features and aspects hereof may be implemented equivalently in electronic circuits or as suitably programmed instructions of a general or special purpose processor. The apparatus 410 may be a storage initiator including one of a SAS controller, a self-configuring SAS expander, and a SATA controller. The apparatus 410 comprises a receiving element 420, a determining element 430, and a resetting element 440. The receiving element 420 is adapted for receiving an FIS from a SATA target device over a link. The determining element 430 is adapted for determining whether the FIS is valid. Additionally, the resetting element 440 is adapted for resetting the link in direct response to the determining element determining that the FIS is invalid, in that resetting the link immediately follows the determining element determining that the FIS is invalid.

Those of ordinary skill in the art will readily recognize numerous additional and equivalent components and modules within a fully functional system and apparatus. Such additional and equivalent components are omitted herein for simplicity and brevity of this discussion. Thus, the structures of FIGS. 1 and 4 are intended merely as representatives of exemplary embodiments of features and aspects hereof.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for improving detection of a Serial Advanced Technology Attachment ("SATA") target device by a storage initiator over a link, the method comprising:
   receiving, at the storage initiator, a Frame Information Structure ("FIS") from the SATA target device;
   determining, at the storage initiator, whether the FIS is valid; and
   resetting the link in direct response to the determination step determining the FIS is invalid immediately following the determination step.

2. The method of claim 1, wherein the SATA target device comprises a SATA storage device.

3. The method of claim 1, wherein the SATA target device comprises a SATA disk drive.

4. The method of claim 1, wherein the storage initiator comprises a Serial Attached SCSI ("SAS") controller.

5. The method of claim 1, wherein the storage initiator comprises a self-configuring SAS expander.

6. The method of claim 1, wherein the storage initiator comprises a SATA controller.

7. The method of claim 1, wherein the determining step comprises checking an indication of a Device to Host FIS type in the FIS.

8. The method of claim 1, wherein the determining step comprises checking an indication of an AT Attachment ("ATA") signature in the FIS.

9. The method of claim 1, wherein the determining step comprises checking an indication of an AT Attachment Packet Interface ("ATAPI") signature in the FIS.

10. The method of claim 1, wherein the resetting step comprises issuing a reset command from the storage initiator to the SATA target device immediately following the determining step.

11. An apparatus for detecting a Serial Advanced Technology Attachment ("SATA") target device over a link, the apparatus comprising:
    a receiving element for receiving a Frame Information Structure ("FIS") from the SATA target device;
    a determining element for determining whether the FIS is valid; and
    a resetting element for resetting the link in direct response to the determining element determining that the FIS is invalid, wherein resetting the link immediately follows the determining element determining that the FIS is invalid.

12. The apparatus of claim 11, wherein the SATA target device comprises a SATA storage device.

13. The apparatus of claim 11, wherein the SATA target device comprises a SATA disk drive.

14. The apparatus of claim 11, wherein the apparatus is a Serial Attached SCSI ("SAS") controller.

15. The apparatus of claim 11, wherein the apparatus is a self-configuring SAS expander.

16. The apparatus of claim 11, wherein the apparatus is a SATA controller.

17. The apparatus of claim 11, wherein the determining element is further adapted for checking an indication of a Device to Host FIS type in the FIS.

18. The apparatus of claim 11, wherein the determining element is further adapted for checking an indication of an AT Attachment ("ATA") signature in the FIS.

19. The apparatus of claim 11, wherein the determining element is further adapted for checking an indication of an AT Attachment Packet Interface ("ATAPI") signature in the FIS.

20. The apparatus of claim 11, wherein the resetting element is further adapted for issuing a reset command from the storage initiator to the SATA target device immediately following the determining element determining that the FIS is invalid.

* * * * *